United States Patent
Smith et al.

(10) Patent No.: US 7,036,982 B2
(45) Date of Patent: May 2, 2006

(54) METHOD AND APPARATUS TO CONTROL AN EXHAUST GAS SENSOR TO A PREDETERMINED TERMPERATURE

(75) Inventors: James Craig Smith, Farmington Hills, MI (US); Wayne Richard Moore, Goodrich, MI (US); Matthew G. Foster, Davison, MI (US)

(73) Assignee: Delphi Technologies, Inc., Troy, MI (US)

( * ) Notice: Subject to any disclaimer, the term of this patent is extended or adjusted under 35 U.S.C. 154(b) by 69 days.

(21) Appl. No.: 10/286,201

(22) Filed: Oct. 31, 2002

(65) Prior Publication Data

US 2004/0086023 A1  May 6, 2004

(51) Int. Cl.
*G01K 13/00* (2006.01)
*F02D 41/00* (2006.01)
*F01N 3/00* (2006.01)

(52) U.S. Cl. .................. 374/144; 374/165; 123/697; 123/679; 73/23.32; 60/277

(58) Field of Classification Search ............... 123/697, 123/679, 676; 374/144, 142, 102, 141, 39, 374/40; 73/23.32, 23.2; 204/401; 60/272, 60/277
See application file for complete search history.

(56) References Cited

U.S. PATENT DOCUMENTS

| | | | |
|---|---|---|---|
| 3,851,469 A * | 12/1974 | Eichler et al. ............... 60/277 |
| 4,563,991 A * | 1/1986 | Akatsuka et al. ............ 123/697 |
| 4,708,777 A * | 11/1987 | Kuraoka .................. 205/784.5 |
| 4,749,122 A * | 6/1988 | Shriver et al. ................ 236/14 |
| 4,854,167 A * | 8/1989 | Czarnocki et al. ........ 73/204.19 |
| 5,111,792 A * | 5/1992 | Nagai et al. ................. 123/685 |
| 5,140,535 A | 8/1992 | Raff et al. |
| 5,228,426 A * | 7/1993 | Pursifull et al. ............ 123/690 |
| 5,245,979 A * | 9/1993 | Pursifull et al. ............ 123/690 |
| 5,249,453 A * | 10/1993 | Usami et al. ............... 73/23.32 |
| 5,253,630 A | 10/1993 | Akazaki et al. |
| 5,279,145 A * | 1/1994 | Suzuki ..................... 73/23.32 |
| 5,314,828 A * | 5/1994 | Dalla Betta et al. ......... 436/118 |
| 5,521,099 A * | 5/1996 | Glaunsinger et al. ....... 436/151 |
| 5,544,639 A * | 8/1996 | Shouda et al. .............. 123/676 |
| 5,588,417 A | 12/1996 | Kotwicki et al. |
| 5,605,040 A | 2/1997 | Cullen et al. |
| 5,614,658 A * | 3/1997 | Moss ....................... 73/23.31 |
| 5,656,190 A | 8/1997 | Aoki |
| 5,662,418 A * | 9/1997 | Deak et al. ................. 374/144 |
| 5,708,585 A * | 1/1998 | Kushion .................... 701/108 |
| 5,719,778 A * | 2/1998 | Suzumura et al. .......... 700/207 |
| 5,740,675 A | 4/1998 | Shimasaki et al. |
| 5,782,227 A | 7/1998 | Abe |
| 5,816,231 A | 10/1998 | Inoue |
| 5,836,292 A * | 11/1998 | Aoki ......................... 123/697 |

(Continued)

*Primary Examiner*—Gail Verbitsky
(74) *Attorney, Agent, or Firm*—Jimmy L. Funke (57) ABSTRACT

The invention provides a control strategy and a control system to control a gas sensor to a target operating temperature. It relies upon both feedback and model-based feedforward control systems to achieve and then maintain the sensor at the target operating temperature. The mechanization includes a gas sensor with a heating element in a feedstream. The control strategy employs a control system for the heating element that is based upon the target operating temperature, the temperature of the heating element, and an effect of the feedstream and mounting structure on the temperature of the sensor. The control strategy enables the control system to optimize the heating of a sensor during warm-up and steady state operations.

14 Claims, 3 Drawing Sheets

U.S. PATENT DOCUMENTS

| | | |
|---|---|---|
| 5,941,928 A * | 8/1999 | Naber et al. ............... 701/109 |
| 6,188,049 B1 | 2/2001 | Osaki |
| 6,227,033 B1 | 5/2001 | Kainz |
| 6,240,775 B1 * | 6/2001 | Uramachi et al. ....... 73/204.21 |
| 6,287,453 B1 | 9/2001 | Rosel et al. |
| 6,304,813 B1 * | 10/2001 | Ikeda et al. ................ 701/109 |
| 6,332,459 B1 * | 12/2001 | Ehara et al. ................ 123/697 |
| 6,343,499 B1 | 2/2002 | Inagaki et al. |
| 6,384,386 B1 | 5/2002 | Hashimoto et al. |
| 6,391,484 B1 * | 5/2002 | Keskula et al. ............... 429/13 |
| 6,484,561 B1 | 11/2002 | Jackson et al. |
| 6,541,741 B1 * | 4/2003 | Ikeda ........................ 219/492 |
| 6,544,405 B1 | 4/2003 | Clyde et al. |
| 6,550,305 B1 * | 4/2003 | Tomisawa .................. 73/1.06 |
| 6,551,498 B1 | 4/2003 | Nelson |
| 6,562,215 B1 | 5/2003 | Nelson et al. |
| 6,613,208 B1 | 9/2003 | Vargo et al. |
| 6,619,261 B1 * | 9/2003 | Wang et al. ................ 123/435 |
| 6,649,041 B1 * | 11/2003 | Hashimoto et al. ......... 205/785 |
| 6,651,639 B1 | 11/2003 | Hada et al. |
| 6,679,238 B1 * | 1/2004 | Nebiyeloul-Kifle et al. 123/676 |
| 6,696,673 B1 | 2/2004 | Okamoto |
| 6,823,839 B1 * | 11/2004 | Yasui et al. ............ 123/339.12 |
| 2003/0187568 A1 * | 10/2003 | Yasui et al. ................ 701/109 |
| 2004/0030485 A1 * | 2/2004 | Yasui ........................ 701/109 |
| 2004/0047396 A1 * | 3/2004 | Nomura et al. ............. 374/141 |
| 2004/0050693 A1 * | 3/2004 | Davey et al. ............... 204/400 |
| 2004/0099528 A1 * | 5/2004 | Hattori ....................... 204/401 |

* cited by examiner

METHOD AND APPARATUS TO CONTROL AN EXHAUST GAS SENSOR TO A PREDETERMINED TERMPERATURE

TECHNICAL FIELD

This invention pertains generally to gas sensors, and more specifically to a control system for controlling an operating temperature of an exhaust gas sensor.

BACKGROUND OF THE INVENTION

Sensors are used in control systems of internal combustion engines and other combustion devices to measure operating parameters and constituents of a resulting feedstream. Sensor information is provided to a controller that can control an incoming feedstream or trigger an alarm based upon the measured parameter or constituent. For example, an exhaust gas sensor in a control system of an internal combustion engine is used to measure the parameter of air/fuel ratio. An engine controller can then use the air/fuel ratio information to control the feedstream that flows through the engine and into an aftertreatment system, such as a catalytic converter. A properly controlled gas feedstream is important for complete operation of the exhaust aftertreatment system during light-off and steady-state warmed-up operation of the control system.

A control system must have accurate, timely feedback from the feedstream to effectively control a device such as an engine. Optimal performance of an exhaust aftertreatment system relies upon a controlled, predictable feedstream. Precise control of the exhaust gas feedstream is becoming more important with the implementation of new engine technologies, including direct injection fuel injection systems and lean-burn control systems.

A sensor takes a certain amount of time to warm up and become fully operational. The amount of time to full operation is affected by the power delivered to a heating element of the sensor and the heat transferred between the sensor by the feedstream and the surrounding environment, including any heat transferred from a mounting structure for the sensor.

The ability to maintain the sensor at a target operating temperature leads to more precise output of the sensor in systems wherein the sensor output is dependent upon the operating temperature. A specific example of an interaction between the operating temperature and measurement ability of a sensor is a zirconium-oxide exhaust gas sensor that is used for internal combustion engine control and diagnostics. The output of the sensor varies as a function of the sensor's operating temperature when measuring in a rich air/fuel region. The voltage output of the zirconium-oxide exhaust gas sensor is a function of the partial pressure of oxygen in the feedstream compared to a reference value, and the operating temperature of the zirconium-oxide cell. This has been described using the Nernst equation, which is a governing equation for a zirconium-oxide exhaust gas sensor:

Sensor Output, $V_{SEN}$(volts)=$K*T_S*\text{Ln}([P(O_2)_{REF}]/[P(O_2)_{EXHAUST}])$ wherein: $K=R/(4F)$
R=Universal Gas Constant (8.315 J/mole-K)
F=Faraday Constant (96.485 Coulomb/gmole equiv)
$T_S$=Operating Temperature (K) of the Sensor
$P(O_2)_{REF}$=partial pressure of Oxygen, in a reference cell
$P(O_2)_{EXHAUST}$=partial pressure of Oxygen, in the monitored feedstream.

As can be seen, the operating temperature $T_S$ of the sensor directly influences the sensor output, $V_{SEN}$. A control system can rely more completely on the output of the sensor as a measure of the partial oxygen pressure when the sensor is maintained at a specific temperature. This permits more precise control of the system using the sensor. In the case of the zirconium-oxide oxygen sensor, control of the operating temperature of the sensor which also allows a range of the output of the sensor to be linearized, leading to more precise measurement and control of exhaust gas air/fuel ratio.

The prior art has sought to improve the accuracy, in terms of measurement repeatability, of a gas sensor by adding a heating element to the sensor. The prior art has also sought to control an amount of power delivered to a heating element of a gas sensor so the heating element operates at a specific temperature. It is inferred that the sensor element operates above a minimum temperature, under known conditions. It accomplishes the control of power to the heating element by using basic and auxiliary electric power and relying upon a measure of engine coolant temperature for feedback. This control is primarily focused upon maintaining sensor temperature above a certain level when the system is in a warmed-up operating condition. The prior art has also controls the heating element by measuring an internal resistance of the heating element before and during sensor operation, and controlling the power delivered to the heating element based upon a ratio of the two measured resistances. This strategy heats a sensor to a predetermined temperature using information from the heating element as feedback. The prior art does not control temperature and operation of the sensor based upon any external effects, including heat transfer from the feedstream environment and the sensor mounting structure. The prior art also does not use a physical model to assist in determining the sensor temperature.

Therefore, there is a need to improve the measurement accuracy, repeatability and durability of a sensor by compensating for any effect on operating conditions due to changes in the sensor environment. There is a need to compensate for any effect on sensor temperature caused by changes in the gas feedstream or due to heat transfer between the sensor and a mounting structure for the sensor. There is also a need to determine and control heat energy transfer to a sensor during sensor warm-up.

SUMMARY OF THE INVENTION

The present invention is an improvement over conventional gas sensor heating element control systems in that it provides a method and apparatus to determine the sensor operating temperature based upon an electrical heat input to the sensor, the gas feedstream temperature, and the mounting structure of the sensor. The method and apparatus control the gas sensor to a target operating temperature, using a control strategy and control system. The present invention relies upon a heating model, and feedback and model-based feedforward control systems to achieve and maintain the sensor at the target operating temperature. This includes providing a gas sensor with a controllable heating element which is preferably a resistive device. The gas sensor is operable to measure a parameter of the gas feedstream. The control strategy employs a control system for the heating element that is based upon the target operating temperature, the temperature of the heating element, and an effect of the feedstream and mounting structure on the temperature of the sensor. The control strategy enables the control system to optimize the heating of a sensor during a warm-up period, but still prevent overheating of the sensor.

The control strategy determines the external effects of the feedstream and mounting structure on the temperature of the sensor by employing a feedforward disturbance rejection that is based upon a determination of heat transfer from the feedstream and a sensor mounting structure.

The target operating temperature of the sensor can be a maximum operating temperature, or a steady-state operating temperature that is less than maximum, or it can be a predetermined operating temperature. When the control strategy operates at a predetermined operating temperature, it employs heating element control techniques that address the specific operating characteristics of the system. For example, a control strategy may have a goal to operate at a sensor temperature below a maximum operating temperature, in order to allow the system to be able to accommodate variations in other areas that influence the sensor operating temperature. This includes variations caused by changes in the temperature of the feedstream, or variations in system voltage levels. A control strategy may instead seek to limit the time-rate change in temperature of the sensor during a warm-up period. The desire to limit the warm-up rate can be based upon concerns for sensor durability, or concerns for changes in feedstream during the warm-up period. One such change in the feedstream occurs when the sensor is used to measure an output from a combustion process, as when the sensor is used to monitor an output from an internal combustion engine. Water is created as a byproduct of combustion and results in airborne water droplets, especially during the warm-up period. The water droplets impinge upon a sensor and cause thermal shock of the sensor element or external shield. A limit on the warm-up rate of the sensor improve the durability of the sensor by reducing a risk of thermal shock and material degradation caused by water impingement. A limit in the warm-up rate may also be based upon a need to manage electrical energy consumption in the system. The control system limits power delivered to the sensor at initial startup and other times when the system does not require the sensor to be operational.

The feedback system of the invention is based upon the need to control the sensor to the target operating temperature. The temperature of the sensor is inferred from the temperature of the controllable heating element. The feedback system is configured to measure the temperature of the controllable heating element during normal operation, and provide the temperature as feedback to the control system. The controller uses an output device that is capable of providing a pulsewidth-modulated power output to the controllable heating element, and also capable of measuring an impedance of the controllable heating element when no power is being output. The controller converts the impedance of the controllable heating element to a temperature measurement, based upon a predetermined calibration of impedance versus temperature. The feedback system also includes a method to compensate for changes in impedance over time due to system aging. The feedback system measures the resistance of the heating element when the temperature is a known value. This is done when the system is not operating and the ambient temperature can be determined with another sensor, such as before a cold starting event.

The required heat to be transferred to the sensor for the sensor to reach the target operating temperature is determined next, based upon the measured temperature of the controllable heating element. The control strategy also uses the external feedforward system to control the temperature of the sensor while accounting for the amount of heat transferred between the sensor, the feedstream, and the mounting structure.

The external feedforward system is based upon the physical relationship between the sensor, the feedstream, and the mounting structure. The physical relationship affects the operating temperature and therefore the output signal of the sensor. The feedforward system measures the feedstream and determines an amount of heat that is transferred between the sensor, the feedstream, and the mounting structure. The magnitude of heat transfer between the sensor and feedstream is determined with information that is available to the control system. The characteristics of greatest importance for heat transfer in the system include mass flow and temperature of the feedstream. Values for mass flow and temperature are measured or inferred, and a thermal model is created that is used by the control system to determine the effect of heat transfer on the operating temperature of the sensor.

The control strategy uses the control system to maintain the operating temperature of the sensor, based upon the feedback and feedforward systems. The control strategy determines the amount of heat that must be transferred to the sensor using the controllable heating device. It does this by adding the heat transfer that is determined by the feedforward system to the required heat transfer, as determined by the feedback system. The control strategy then uses the resulting heat transfer to control the power to the controllable heating element.

The present invention also provides an improvement over conventional engine control devices in that it is a method for controlling the heating element of a sensor during a cold starting event. The method includes estimating a temperature of the sensor based upon the amount of heat transfer between the sensor and the feedstream, the mounting structure, and the controllable heating element. The method operates the controllable heating element at maximum power until it is determined that the estimated temperature of the sensor is near a targeted temperature.

The present invention also provides an improvement over conventional engine control devices in that it is a method to provide an exhaust gas sensor with a linear output that corresponds to a change in air/fuel ratio. The invention is based upon the concept that an output from an exhaust gas sensor is repeatable over a range of air/fuel ratios when the sensor is operated at a specific, known temperature. The invention includes providing a gas sensor in an exhaust gas feedstream with a controllable heating element. The method operates by first calculating an effect by the feedstream on a temperature of the exhaust gas sensor by the feedstream, using a feedforward system, and determining a temperature of the controllable heating element. The method then maintains the exhaust gas sensor at the known temperature by controlling the controllable heating element, based upon the temperature of the controllable heating element and the calculated effect of the feedstream on the temperature of the exhaust gas sensor. When the air/fuel ratio is at or near lambda=1.0, the sensor is typically operable to accurately measure the air/fuel ratio over a range of +/−3% lambda.

The present invention also provides an improvement over conventional engine control devices in that it provides an exhaust gas sensing system controllable to a targeted temperature. This includes having an exhaust gas sensor with a controllable heating element operably attached to a controller. The exhaust gas sensor is in a feedstream and the controller is able to determine at least one operating parameter of the feedstream. The controller also calculates an effect on a temperature of the exhaust gas sensor, based upon the operating parameter, and determines a temperature of the controllable heating element. The controller controls the controllable heating element based upon a targeted temperature of the exhaust gas sensor, the temperature of the controllable heating element, and the calculated effect on the temperature of the exhaust gas sensor. These and other objects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE PREFERRED EMBODIMENT

Figure 1:
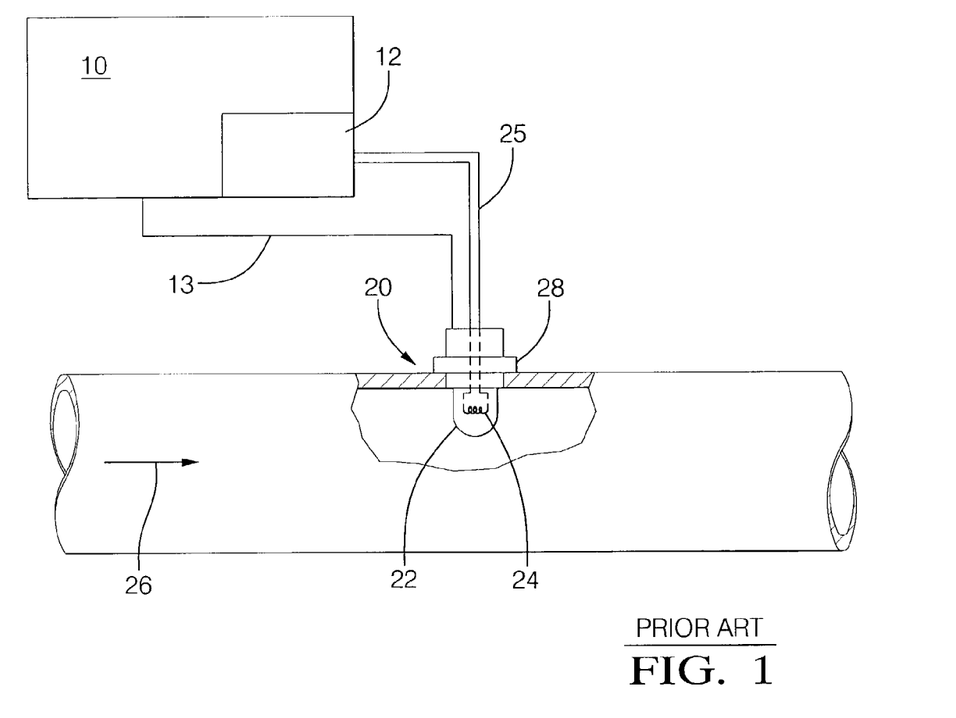
FIG. 1 is a schematic of an exhaust gas sensor in an operating environment, in accordance with the present invention.

Referring now to the drawings, wherein the showings are for the purpose of illustrating an embodiment of the invention only and not for the purpose of limiting the same, FIG. 1 shows an exhaust gas sensing system controllable to a predetermined temperature which has been constructed in accordance with an embodiment of the present invention. The system includes an exhaust gas sensor 20 comprising a sensing element 22 and a controllable heating element 24 that is operably attached to a controller 10. The controller 10 has an output device 12 that is operably attached to the controllable heating element 24. There is a signal, $V_{SEN}$, that is the output of the sensing element 22 and is input to the controller 10 over signal line 13. In this embodiment, the exhaust gas sensor 20 is mounted in an exhaust feedstream 26 of an internal combustion engine (not shown) that is controlled by the controller 10. The sensor is mounted in an exhaust pipe on a mounting structure 28 that can comprise a threaded mounting boss or another device suitable for mounting a sensor in the exhaust feedstream. The internal combustion engine has various other sensors and output devices that are monitored and controlled by the controller 10.

The controller 10 contains algorithms and calibrations (not shown) and gathers information from the various sensors (not shown). The controller then controls the output devices (not shown) and manages the feedstream through the internal combustion engine based upon the algorithms, calibrations, and information from the various sensors (not shown). The feedstream that flows into the engine (not shown) determines the exhaust feedstream 26 out of the engine. The controller 10 uses an output from the exhaust gas sensing element 22 to control the exhaust feedstream 26. The internal combustion engine (not shown), controller 10 with algorithms and calibrations, and the sensor 20 in the exhaust feedstream 26 are well known to one skilled in the art.

The feedstream 26 in this embodiment comprises an exhaust gas feedstream that is a waste product output from a combustion process of the internal combustion engine (not shown). The feedstream 26 is characterized by parameters that include mass flowrate, temperature, air/fuel ratio, and by concentrations of various gas constituents. The gas constituents can include hydrocarbons, carbon monoxide, nitrides of oxygen, and other gases that are regulated by various federal or state emissions laws and regulations. The gas constituents can also include unregulated gases, e.g. oxygen and carbon dioxide. The characterization of the gas feedstream in terms of parameters and constituents is well known to one skilled in the art.

The sensing element 22 of the sensor 20 of this embodiment is comprised of zirconium oxide and is operable to measure a parameter of the feedstream 26, preferably a partial pressure of oxygen. Alternatively the sensing element 22 can be operable to measure the air/fuel ratio of the feedstream 26 over a wide range. Alternatively, the sensing element 22 can be operable to measure constituents of the feedstream 26, including, for example nitrogen ($N_2$), carbon dioxide ($CO_2$), carbon monoxide (CO), or hydrocarbons (HC). The heating element 24 is comprised of an electrical resistive element or a positive temperature coefficient electrical resistive element, and is electrically connected to the output device 12 of the controller 10 using an electrical wiring harness 25. There is a relationship between the resistance and a temperature of the heating element 24 that can be determined during development of the sensor 20 and is consistent from part to part. This relationship is stored in the controller 10 for use by an engine control system (not shown).

The output device 12 of the controller 10 is preferably a device that is operable to deliver a controlled amount of electrical power to the heating element 24 in the form of a pulsewidth modulated ('PWM') signal in response to a control signal, $V_{CTRL}$ from the controller. The PWM signal, $V_{PWM}$, is preferably a square wave signal that alternates between zero voltage and system voltage $V_{SYS}$ at a given frequency. The amount of power that is delivered by the output device 12 to the controlled heating element 24 is determined by the frequency of the PWM signal and a percentage of time during each cycle that the voltage level is at the system voltage $V_{SYS}$. The sensor 20 with the output device 12, the PWM controlled heating element 24, and the controller 10 are well known to one skilled in the art.

Figure 2:
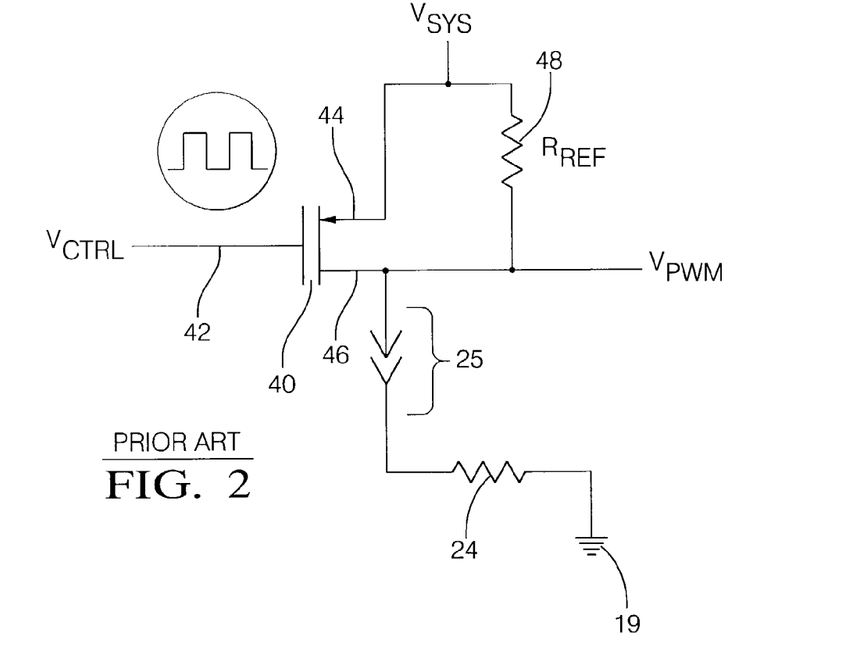
FIG. 2 is a schematic of an exhaust gas sensor and an electrical circuit, accordance with the present invention.

Referring now to FIG. 2, a temperature, $T_{HTR}$, of the heating element 24 can be determined using the output device 12 that is electrically attached to the controller 10. The output device 12 is comprised of a field effect transistor 40 with a gate 42, source 44, and drain 46. The gate 42 is electrically connected to the controller and receives the PWM signal $V_{CTRL}$. The source 44 of the field effect transistor 40 is electrically connected to the system voltage, $V_{SYS}$. The drain 46 of the field effect transistor 40 is electrically connected to the controller 10 such that the controller is operable to measure the voltage $V_{PWM}$ that is delivered to the heating element 24. There is a circuit that is comprised of the system voltage, $V_{SYS}$, a reference resistor 48, the heater circuit 25, and the heating element 24 in series with an electrical ground 19. The controller 10 is also operable to measure $V_{SYS}$. The controller determines the heating element resistance $R_{HTR}$ during a time when $V_{CTRL}$ is at zero voltage, i.e. when no power is being delivered to the heating element 24. The controller 10 determines the total resistance of the heater circuit 25 and the heating element 24 by applying Ohm's Law to the measured values, $V_{SYS}$ and $V_{PWM}$, and the reference resistor 48. The resistance of the heater circuit 25 is calibrated in the controller 10, and the controller then determines the resistance of the heating element 24 by subtracting the resistance of the heater circuit 25 from the total resistance. The controller 10 also contains a calibration with which it can convert the resistance of the heater circuit 25 into the temperature value, $T_{HTR}$. The controller 10 also measures $R_{HTR}$ during a time when the engine is not operating and when it is known that the temperature of the exhaust feedstream 26 and exhaust gas sensor 20 are at ambient conditions. This is accomplished using input from another temperature sensor that is operably connected to the controller 10, for example an intake air temperature sensor (not shown) or an engine coolant temperature sensor (not shown). The controller 10 then uses the $R_{HTR}$ value measured at the ambient conditions to calibrate the heating element 24. The controller 10 also uses the information collected with the output device 12 regarding $R_{HTR}$ to diagnose malfunctions in the circuit 25 and the heating element 24. The controller 10 also diagnoses when the resistance $R_{HTR}$ falls outside a range of expected values, which indicates a short circuit, an open circuit, or deterioration in the heater circuit 25.

Figures 3, 4:
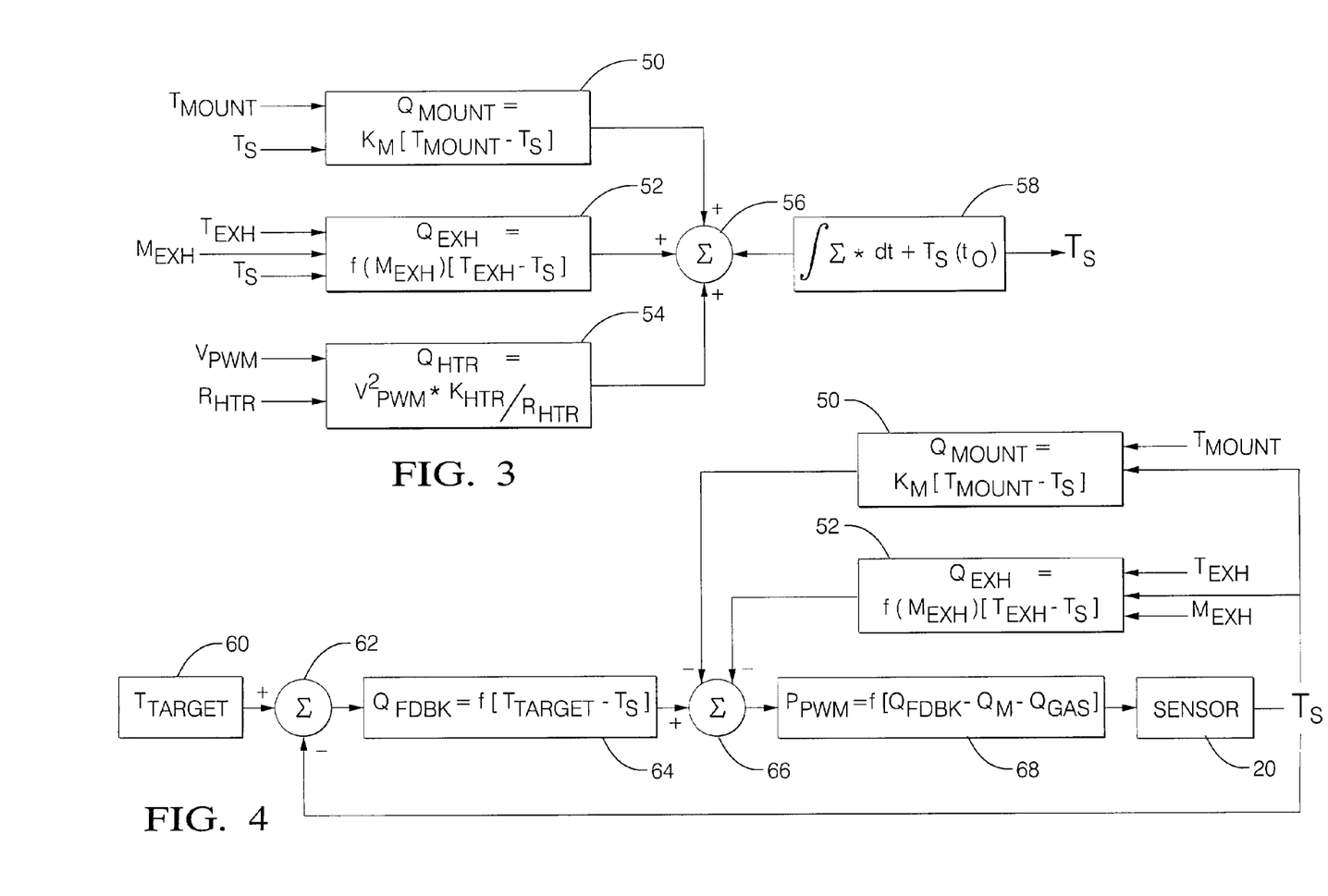
FIG. 3 is a schematic of a heating model, in accordance with the present invention.
FIG. 4 is a schematic of a closed-loop control model, in accordance with the present invention.

Referring now to FIG. 3, a heating model for determining a temperature of the sensing element 22 is shown that is in accordance with the present invention. In this embodiment, the heating model that is shown is for use with the exhaust gas sensor 20 of the internal combustion engine previously referred to with respect to FIGS. 1 and 2. The heating model is implemented in the controller 10 using algorithms, inputs from sensors and the electrical circuits as shown in FIGS. 1 and 2, and is executed during a loop cycle, in this embodiment a 100-millisecond loop. Each of the determinations and calculations described herein are executed in an ordered fashion. The implementation of control strategies using a controller 10 is well known to one skilled in the art.

The heating model shown in FIG. 3 comprises a method for determining a temperature of the sensing element 22 in the feedstream 26. It includes determining an initial temperature of the sensing element 22. The method then determines an amount of heat transfer between the sensing element 22 and the feedstream, the sensor mounting structure, and the sensor heating element 24. A net temperature change in the sensor 20 is determined by calculating a time-integral of a sum of the amount of heat transfer between the sensing element 22 and the feedstream 26, the sensor mounting structure 28, and the sensor heating element 24. The net temperature change is added to the initial temperature of the sensing element 22 to determine sensor temperature $T_S$. The heating model is used by an open loop control strategy and a closed loop control strategy to control the temperature of the sensing element 22.

The initial temperature of the sensing element 22 can be determined as part of detecting that a cold starting event has occurred. The initial temperature of the sensing element 22 is determined based upon the resistance of the controllable heating device, as described previously with respect to FIG. 2.

The amount of heat transfer $Q_{EXH}$ between the sensing element 22 and the feedstream 26 is determined by calculating a difference between the temperature of the feedstream $T_{EXH}$ and the sensor temperature $T_S$. The difference is then multiplied by a first predetermined heat transfer coefficient $F(M_{EXH})$, which is a function of the mass flowrate $M_{EXH}$ of the exhaust feedstream. This is shown in Block 52. The first predetermined heat transfer coefficient, $F(M_{EXH})$ is a measure of the efficiency of heat transfer between the exhaust feedstream 26 and the sensing element 22. It comprises a calibration array in the controller 10 that is derived and verified experimentally for a given system configuration and representative operating conditions. The calibration array can be a single scalar value, or an array of scalar values wherein a specific value for $F(M_{EXH})$ is selected by the controller 10 based upon the operating conditions. The amount of heat transfer between the sensor 20 and the feedstream 26, $Q_{EXH}$, can be a negative or a positive value, depending on the relative values of the temperatures of the feedstream and the sensing element 22.

The measured parameters from the exhaust gas feedstream 26 that are used as inputs to Block 52 include a mass air flowrate, $M_{EXH}$, an exhaust gas temperature $T_{EXH}$ and sensor temperature $T_S$. The mass flowrate $M_{EXH}$ is determined using existing inputs to the controller 10. These inputs comprise a direct measurement of incoming mass flow of air, using a mass airflow sensor (not shown) in this embodiment.

The measure of air mass through an internal combustion engine using the mass airflow sensor (not shown) is well known to those skilled in the art. The feedstream temperature $T_{EXH}$ is an estimated temperature value that is derived from engine operation, and is determined from parameters that include engine speed, manifold absolute pressure, exhaust gas recirculation rate, ignition spark advance; coolant temperature and engine operating time. The temperature $T_M$ of the mounting structure 28 is an estimated value that is derived from engine operation, and is determined from parameters that include engine operating time, engine coolant temperature, and temperature $T_{EXH}$ of the feedstream 26. The feedstream temperature $T_{EXH}$ and the mounting structure temperature $T_M$ are based upon measured and estimated parameters and are unique to a given combination of engine and vehicle. The determinations of the feedstream temperature $T_{EXH}$ and the mounting structure temperature $T_M$ are known to one skilled in the art.

The amount of heat transfer, $Q_{MOUNT}$ between the sensing element 22 and the sensor mounting structure 28, is determined by calculating a difference between the temperature of the mounting structure $T_M$ and the sensor $T_S$. The difference is multiplied by a second predetermined heat transfer coefficient $K_M$ to determine the total heat transfer during the time period of the cycle of operation described previously. This is shown in Block 50. The second predetermined heat transfer coefficient $K_M$ is a measure of the efficiency of heat transfer between the sensor mounting structure 28 and the sensing element 22. The second heat transfer coefficient $K_M$ is a calibration value in the controller 10 that is derived and verified experimentally for a given system configuration and representative operating conditions. It can be a single scalar value, or an array of scalar values wherein a specific value for $K_M$ is selected by the controller based upon the operating conditions. The amount of heat transfer between the sensing element 22 and the sensor mounting structure 28 can be a negative or a positive value, depending on the relative values of the temperatures of the sensor mounting structure 28 and the sensing element 22. The determination of heat transfer indicates whether there is a net transfer of heat energy from the feedstream 26 or the mounting structure 28 into the sensing element 22, or net transfer of heat energy from the sensing element 22 into the feedstream 26 or mounting structure 28. Determination of the magnitudes of the heat transfer coefficients, $F(M_{EXH})$ and $K_M$ is generally known to one skilled in the art.

The amount of heat transfer between the gas sensing element 22 and the sensor heating element 24 is determined by calculating an amount of electrical power transferred to the heating element 24 and multiplying it by a sensor/heating element heat transfer coefficient, $K_{HTR}$, as shown in Block 54. The amount of electrical power is determined by calculating a squared value of the voltage $V_{PWM}$, and dividing by the resistance $R_{HTR}$ of the heating element 24. The sensor/heating element heat transfer coefficient, $K_{HTR}$ is a measure of the efficiency of heat transfer between the heating element 24 and the sensing element 22. It comprises a calibration array in the controller 10 that must is derived experimentally for a specific sensor design. The calibration array is typically a single scalar value. Determination of heat transfer values for sensors and heating elements is known to one skilled in the art.

A change in temperature of the gas sensing element 22 is determined by calculating the total heat transfer between the gas sensing element 22 and the feedstream 26, the sensor mounting structure 28, and the sensor heating element 24, as shown in Block 56. The controller calculates a time-integral of the total heat transfer to determine a change in temperature, as shown in Block 58. The change in temperature is added to the initial temperature, designated as $T_S(t_O)$, to determine the sensor temperature $T_S$ as shown again in Block 58. The sensor temperature $T_S$ is stored in the controller 10 for use in the next execution of the heating model or control, which occurs during the next loop cycle.

Referring now to FIG. 4, a closed-loop control strategy for controlling sensor temperature $T_S$ is shown. The closed-loop control strategy uses elements of the heating model described in reference to FIG. 3. The closed-loop control strategy is executed as part of ongoing operation of the controller 10, for example within a specific cycle of operation. Each of the determinations and calculations described herein are executed in an ordered fashion. The implementation of closed-loop control strategies using a controller 10 is well known to one skilled in the art.

The intent of the closed-loop control strategy is to control the sensor temperature $T_S$ to a predetermined temperature, $T_{TARGET}$, as shown in block 60. The resistance $R_{HTR}$, of the heating element 24 is measured, and the temperature, $T_{HTR}$, is determined, as described in relation to FIG. 2. In this embodiment, the temperature, $T_{HTR}$ of the heating element 24 is used as a measure of the sensor temperature $T_S$. The sensor temperature $T_S$ is then subtracted from the value for $T_{TARGET}$ (block 62). This difference comprises the difference between the targeted temperature of the sensor and the actual temperature of the sensor and is indicative of the amount of heat energy that must be transferred to the sensing element 22 to reach the targeted temperature. The difference $(T_{TARGET}-T_S)$ is used in Block 64 to execute a feedback control strategy and determine a heat transfer value $Q_{FDBK}$ that is output to block 66.

There is also external heat transfer that is comprised of $Q_{EXH}$, which is the heat transfer between the sensing element 22 and the feedstream 26, and $Q_{MOUNT}$, which is the heat transfer between the sensing element 22 and the sensor mounting structure 28. These heat transfer values are described previously with reference to FIG. 3. The heat transfer value $Q_{FDBK}$ is adjusted by the external heat transfer values $Q_{EXH}$ and $Q_{MOUNT}$, as shown in Block 66. The system determines the amount of power $P_{PWM}$ to deliver to the heating element 24 based upon an adjusted heat transfer value, $(Q_{FDBK}-[Q_{EXH}+Q_{MOUNT}])$, as shown in Block 68. The power delivered to the heating element 24 is in the form of a PWM electrical signal from the output device 12 of the controller 10, as described previously.

The targeted temperature $T_{TARGET}$ shown in Block 60 is determined during development of the control system that uses the sensor 20. In this embodiment the system is an internal combustion engine (not shown) and the targeted temperature $T_{TARGET}$ is determined during engine development and calibration. The targeted temperature $T_{TARGET}$ is based upon operating conditions of the system, location of the sensor 20 in the feedstream 26, and other factors related to the design of the control system and hardware.

The closed-loop control strategy may include a requirement that $T_S$ be maintained at a maximum operating temperature at all times during engine operation. $T_{TARGET}$ is then made equal to the maximum operating temperature at all times during engine operation. When the internal combustion engine is started, $T_S$ may be significantly below the maximum operating temperature. The closed-loop control strategy then commands the controller 10 to maximize the amount of power $P_{PWM}$ being delivered from the output device 12 to the heating element 24 during initial operation of the engine (not shown). This happens during a cold start of an engine, for example. When a cold starting event is detected and there is a requirement that $T_S$ be maintained at a maximum operating temperature, a warm-up strategy is executed as described hereinafter.

The closed-loop control strategy may intend that $T_S$ increase at a specific time-rate that is less than maximum, as a method to manage electrical power consumption. In this instance, the closed-loop control strategy controls the predetermined temperature $T_{TARGET}$ such that $T_{TARGET}$ increases at a rate that is less than maximum.

The closed-loop control strategy may intend that $T_S$ follow a preset pattern for temperature, such as remaining below a specific predetermined temperature level until a specific event has occurred. For example, the control system may be comprised of an exhaust gas sensor 20 positioned downstream from an internal combustion engine (not shown) and catalytic converter system (not shown). The closed-loop control strategy controls the predetermined temperature $T_{TARGET}$ such that the temperature of the sensor, $T_S$, remains below a specific temperature until the catalytic converter system achieves sufficient temperature to become exothermic. This type of strategy is implemented to address concerns related to decreased durability of the sensor 20 caused by water impingement from the combustion process during engine warm-up. The specific temperature of the sensor $T_S$ below which the closed-loop control strategy controls the sensing element 22 can be determined during engine and system development, prior to regular production.

Referring again to FIG. 4, the targeted temperature $T_{TARGET}$ is determined for the exhaust gas sensing element 22 as shown in block 60 and described previously. The temperature of the sensor, $T_S$, is also determined as described previously, and is subtracted from $T_{TARGET}$ (Block 62). The difference is indicative of the total amount of heat energy that must be transferred to the sensing element 22 to reach the targeted temperature $T_{TARGET}$. The difference $(T_{TARGET}-T_S)$ is used in Block 64 to execute a feedback control strategy and determine the heat transfer value $Q_{FDBK}$ that is output to block 66. The use of feedback control strategies is well known to one skilled in the art.

Referring again to FIG. 4, the closed-loop control strategy then adjusts the heat transfer value $Q_{FDBK}$ by the external heat transfer value $Q_{EXT}$, as shown by Block 66. The adjusted heat transfer value, $(Q_{FDBK}-[Q_{EXH}+Q_{MOUNT}])$ is used by the controller 10 to determine the amount of power $P_{PWM}$ to deliver to the heating element 24, as shown in Block 68. The power is delivered to the heating element 24 using the output device 12. Deriving an amount of power delivered to the heating element 24 using a PWM electrical signal is well known to those skilled in the art.

Figure 5:
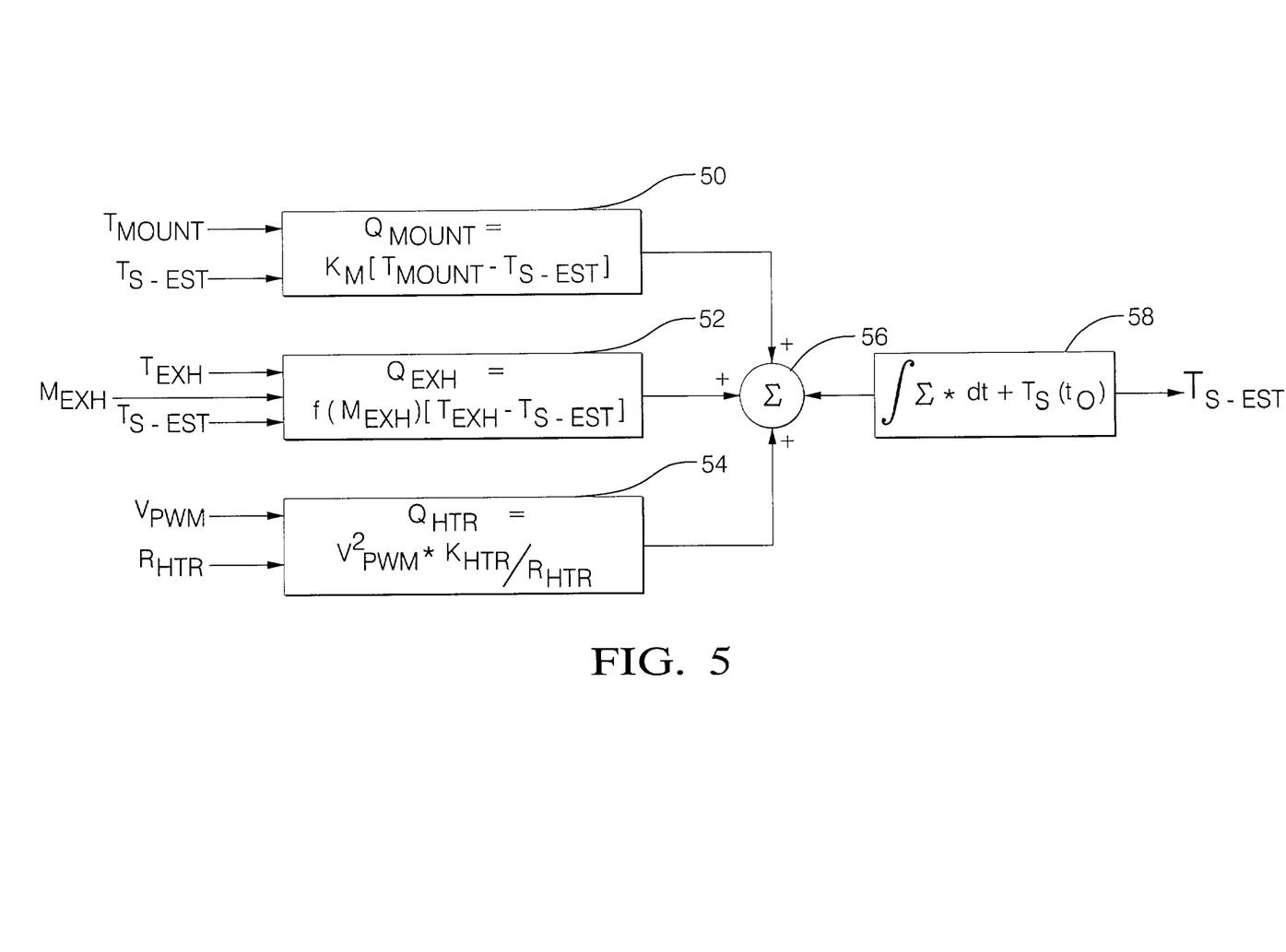
FIG. 5 is a schematic of a heating model, in accordance with the present invention.

Referring now to FIG. 5, a warm-up strategy is now described, based upon the heating model shown in FIG. 3. It is shown for use with the exhaust gas sensor 20 of the internal combustion engine previously referred to with respect to FIGS. 1 and 2. The warmup strategy of FIG. 5 comprises detecting a cold starting event, and maximizing the amount of electrical power $P_{PWM}$ delivered to the sensing element 22, until an estimated sensor temperature $T_{S-EST}$ has reached 90% of a maximum operating temperature. The estimated sensor temperature $T_{S-EST}$ is used as a substitute for the sensor temperature $T_S$, during operation of the warm-up strategy. The heating model is implemented in the controller 10 using algorithms, inputs from sensors and electrical circuits as shown in FIGS. 1 and 2, and is executed during a loop cycle, in this embodiment a 100-millisecond loop. Each of the determinations and calculations described herein are executed in an ordered fashion. The implementation of control strategies using a controller 10 is well known to one skilled in the art.

The warmup strategy shown in FIG. 5 uses inputs from the engine to estimate the sensor temperature $T_{S-EST}$ and control the heating of the sensing element 22. The initial sensor temperature is determined as described previously, and is designated in Block 58 as $T_S(t_O)$. The controller 10 is operable to detect an occurrence of a cold starting event of the engine using information from other input devices, for example an intake air temperature sensor (not shown) and an engine coolant temperature sensor (not shown). Detecting when a cold starting event occurs is well known to one skilled in the art. When a cold starting event is detected, the controller 10 maximizes the amount of electrical power $P_{PWM}$ that is delivered to the heating element 24 by operating at or near a PWM duty cycle of 100%. The controller 10 estimates the sensor temperature $T_{S-EST}$ by executing the heating model each loop cycle, as described previously. The controller 10 employs the warm-up strategy until it has determined that the sensor has reached a targeted temperature value. The estimated sensor temperature $T_{S-EST}$ is used in place of the sensor temperature $T_S$ for determination of the heat transfer $Q_{EXH}$ between the sensing element 22 and the feedstream 26, and for determination of the heat transfer $Q_{MOUNT}$ between the sensing element 22 and the sensor mounting structure 28. In this embodiment, the controller 10 employs the warm-up strategy until the estimated sensor temperature $T_{S-EST}$ has reached 90% of a maximum allowable operating temperature. The controller 10 reduces the power $P_{PWM}$ that is delivered to the heating element when it has determined that the estimated sensor temperature $T_{S-EST}$ has reached 90% of the maximum operating temperature. The controller 10 then discontinues use of the warm-up strategy and begins employment of the closed-loop control strategy at that time.

The invention also comprises a method for providing an exhaust gas sensor 20 with a linear output that corresponds to a change in air/fuel ratio in the feedstream 26, using the closed-loop control strategy, shown in FIG. 4. When the exhaust gas sensing element 22 is a zirconium-based sensor, the invention again comprises providing the exhaust gas sensor 20, including the sensing element 22 and the controllable heating element 24 in an exhaust feedstream 26. The method includes monitoring at least one parameter of the feedstream 26 and calculating an effect on sensor temperature $T_S$ based upon the at least one parameter of the feedstream 26 using the feedforward system, as described previously. The closed-loop control strategy determines $T_{TARGET}$ for the exhaust gas sensing element 22, and controls the controllable heating element 24. Accordingly, control of the heating element 24 is based upon the temperature of the controllable heating element 24 and the calculated effect on the temperature of the exhaust gas sensing element 22, such that the exhaust gas sensing element 22 is operated at the targeted operating temperature.

The targeted operating temperature of the sensing element 22 can be preset in the controller 10, or it can be determined by the controller 10 based upon the operating conditions. When the targeted operating temperature is preset, there is a specific temperature range at which the controller 10 intends the sensing element 22 to operate. The controller 10 then heats the sensing element 22 to the specific temperature range using the control strategy described in FIG. 3 and the mechanization described in FIG. 1 and FIG. 2. For example, it may be decided to operate the sensing element 22 at 500° C.+/−20° C., based on various considerations, including wiring harness design, power consumption, sensor design, location of the sensor in the feedstream, and durability. The controller 10 then identifies the targeted operating temperature range, and the closed-loop control strategy operates to maintain the sensor at that temperature. The controller 10 uses a predetermined calibration that can determine a value for air/fuel ratio based upon the output of the sensing element 22, when the sensing element 22 is operating within the specific temperature range. This value for air/fuel ratio is then used by the engine control system (not shown) to control the internal combustion engine (not shown). Control of an internal combustion engine based upon a measure of air/fuel ratio is well known to those skilled in the art.

Although this is described as a control system for a gas sensor in an exhaust feedstream of an internal combustion engine, it is understood that alternate embodiments of this invention can include any control system that uses a gas sensor in a feedstream wherein the sensor is heated with some form of heating device. The invention describes a heating device that is a resistance temperature device that is driven by a pulsewidth-modulated electrical signal, but the invention comprehends other sensor heating devices and circuits. It is also understood that the invention can include a sensor that is used for diagnostic purposes as well as control purposes, and that the sensor can be located in any appropriate location wherein the sensor can effectively measure the feedstream. It is understood that the controller 10 described in the invention can include more than one physical controller to accomplish the described invention. It is understood that the closed-loop control strategy can be implemented using any combination of software algorithms, electrical circuits, mechanical devices, calibrations and preset conditions.

With regard to the measurement of air mass, the invention includes an inferred measurement of air mass referred to as speed-density. The speed-density calculation is based upon a measure of engine operating parameters including, for example, manifold pressure, engine rotational speed, and throttle position.

With regard to the temperature $T_S$ of the sensor, 20, the invention also includes the use of a sensor wherein $T_S$ is determined based upon the temperature of the heater, $T_{HTR}$. In this embodiment, there is a predetermined method that is used by the controller to derive a value for $T_S$ given a measured value for $T_{HTR}$ along with other measured parameters.

With regard to determination of heat transfer to the sensing element 22, the method includes other methods of determining the temperature of the mounting structure 28 such as a direct measurement of the temperature of the mounting structure 28. With regard to determination of heat transfer to the sensing element 22, the method also includes other methods of determining the heat content of the feedstream 26, such as more direct measurement of the temperature of the feedstream 26. It is also understood that the determination of heat transfer includes all means of heat transfer, i.e. radiant, conductive, and convective means, and the method is not meant to focus on any single heat transfer means.

With regard to the method of gaining a linear output from the sensor that corresponds to a change in air/fuel ratio by controlling the sensor to a preset temperature, the invention includes the ability to operate at more than one preset temperatures, based upon operating conditions of the system. The controller monitors the operating conditions to evaluate an overall capability to maintain the sensor within the targeted operating temperature range. The controller then selects a targeted operating temperature range of the sensing element 22 that is less than a maximum operating temperature, and the closed-loop control strategy controls the operating temperature of the sensor accordingly. The controller linearizes the output of the sensor when the sensor operates within the targeted operating temperature range, based on predetermined calibrations. In so doing, the controller determines a value for air/fuel ratio based upon the linearized output of the sensor.

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. A method for controlling a sensing element to a predetermined temperature, comprising:
   providing a gas sensor including a controllable heating element and a sensing element, wherein the sensing element is operable to measure a parameter of a feedstream;
   determining a temperature of the sensing element;
   determining a targeted temperature of the sensing element;
   determining a feedstream temperature of the feedstream;
   determining a mass flowrate of the feedstream;
   determining an amount of heat transfer between the sensing element and the feedstream based upon the temperature of the sensing element, the feedstream temperature and the mass flowrate; and
   controlling the controllable heating element based upon the temperature of the sensing element, the targeted temperature of the sensing element, and the amount of heat transfer between the sensing element and the feedstream.

2. The method of claim 1, wherein determining the targeted temperature of the sensing element comprises determining a time-rate of change in the temperature of the sensing element.

3. The method of claim 1, wherein determining the targeted temperature of the sensing element comprises implementing a preset pattern for the temperature of the sensing element.

4. The method of claim 1, wherein determining the temperature of the sensing element comprises determining a temperature of the controllable heating element.

5. The method of claim 4, wherein determining the temperature of the controllable heating element comprises
   measuring a resistance of the controllable heating element; and
   determining the temperature of the controllable heating element based upon the resistance of the controllable heating element.

6. The method of claim 5, further comprising
   diagnosing a fault in the controllable heating element when the measured resistance of the controllable heating element is outside an expected range of resistance values.

7. A method for controlling a sensing element to a predetermined temperature, comprising:
   providing a gas sensor mounted in a mounting structure and including a controllable heating element and a sensing element, wherein the sensing element is operable to measure a parameter of a feedstream;
   determining a temperature of the sensing element;
   determining a targeted temperature of the sensing element;
   determining a temperature of the feedstream;
   determining a temperature of the mounting structure for the gas sensor; and,
   calculating an amount of heat transfer between the sensing element and the feedstream and the mounting structure based upon the temperature of the sensing element, the temperature of the mounting structure for the sensing element, and the temperature of the; and
   controlling the controllable heating element based upon the temperature of the sensing element, the targeted temperature of the sensing element and the calculated amount of heat transfer.

8. The method of claim 7 further comprising
   determining a mass flowrate of the feedstream, and
   wherein calculating the amount of heat transfer is based also upon the mass flowrate.

9. A control system for controlling a gas sensor to a predetermined temperature, comprising:
   the gas sensor including a controllable heating element and a sensing element, wherein the sensing element is operable to measure a parameter of a feedstream;
   a controller operably attached to the sensing element, at least one engine sensor, and the controllable heating element, said controller operable to:
      determine a feedstream temperature of the feedstream;
      determine a mass flowrate of the feedstream;
      determine a temperature of the sensing element,
      determine an amount of heat transfer between the sensing element and the feedstream based upon the temperature of the sensing element, the feedstream temperature and the mass flowrate; and
   wherein the controller controls the controllable heating element based upon the predetermined temperature, the amount of heat transfer between the sensing element and the feedstream, and the temperature of the sensing element.

10. The control system of claim 9, wherein the gas sensor comprises an exhaust gas sensor.

11. The control system of claim 9, wherein the sensor comprises a wide range air/fuel ratio sensor.

12. The control system of claim 9, wherein the sensor comprises a gas constituent sensor.

13. The control system of claim 9, wherein the feedstream comprises an exhaust feedstream of an internal combustion engine.

14. The control system of claim 9, wherein the controller is further operable to determine a temperature of a mounting structure for the sensing element, and to determine an amount of heat transfer between the sensing element and the mounting structure, and wherein the controller controls the controllable heating element based also upon the amount of heat transfer between the sensing element and the mounting structure.

* * * * *